(12) United States Patent
Matsuda (10) Patent No.: US 6,838,801 B2
(45) Date of Patent: Jan. 4, 2005

(54) RECTIFYING STRUCTURE AND ROTARY MACHINE EMPLOYING THE SAME

(75) Inventor: Masatoyo Matsuda, Yamato-koriyama (JP)

(73) Assignee: Sanwa Daiya-Kouhan Co., Ltd., Osaka (JP)

( * ) Notice: Subject to any disclaimer, the term of this patent is extended or adjusted under 35 U.S.C. 154(b) by 34 days.

(21) Appl. No.: 10/279,955

(22) Filed: Oct. 25, 2002

(65) Prior Publication Data

US 2003/0102732 A1 Jun. 5, 2003

(30) Foreign Application Priority Data

Oct. 26, 2001 (JP) ........................................ 2001-328876

(51) Int. Cl.[7] ........................... H02K 23/00; H02J 13/00
(52) U.S. Cl. ....................... 310/233; 310/234; 310/237
(58) Field of Search ................................. 310/232, 233, 310/231, 127, 128, 234, 235, 236, 237; 439/17, 19

(56) References Cited

U.S. PATENT DOCUMENTS 5,866,967 A * 2/1999 Sasaki ........................ 310/232

FOREIGN PATENT DOCUMENTS

| JP | 34-14434 | 9/1959 | | |
|---|---|---|---|---|
| JP | 61-142944 | 6/1986 | | |
| JP | 07-059320 | 3/1995 | | |
| JP | 07059320 A | * 3/1995 | .......... | H02K/13/00 |
| JP | 08-256450 | 10/1996 | | |

* cited by examiner

Primary Examiner—Nicholas Ponomarenko
Assistant Examiner—Leda Pham
(74) Attorney, Agent, or Firm—Keating & Bennett LLP (57) ABSTRACT

A low-friction and low-vibration rectifying structure including an electrode-segment forming member of a stator which has two electrode segments disposed therein. An annular stator-side groove is formed in the electrode-segment forming member with two electrode segments. Three commutator segments are disposed in a commutator-segment forming member of a rotor. An annular rotor-side groove is formed in the commutator-segment forming member with the three commutator segments. A conductor ball and an insulator ball are arranged inside of the stator-side groove and the rotor-side groove.

15 Claims, 6 Drawing Sheets

RECTIFYING STRUCTURE AND ROTARY MACHINE EMPLOYING THE SAME

BACKGROUND OF THE INVENTION

1. Field of the Invention

The present invention relates to a rectifying structure and a rotary machine using the same, and more particularly, to a rectifying structure including a commutator segment that is designed for use in a rotary machine such as a DC motor, a DC generator, an AC motor, or an AC generator incorporated in, for example, a vehicle such as an automobile, a household appliance such as a sewing machine or a servo mechanism, and power-generating equipment, or other suitable apparatuses.

2. Description of the Prior Art

Some conventional rectifying structures designed for use in a rotary machine such as a DC motor, a DC generator, an AC motor, or an AC generator include a brush that is made of metal and carbon and is disposed in a stator, and a commutator segment made of metal disposed in a rotor. In such a conventional rectifying structure, the brush is pressed against the commutator segment by a spring.

Inconveniently, however, the above-described conventional rectifying structure suffers from considerable friction and vibration, because the brush is pressed against the commutator segment. The resultant friction acts to damp the movement of the rotor. Moreover, occurrence of friction and vibration causes an energy loss. Friction causes abrasion, whereas vibration interferes with a stable power supply to the rotor and also generates annoying electrical noise.

SUMMARY OF THE INVENTION

In order to overcome the problems described above, preferred embodiments of the present invention provide a low-friction and low-vibration rectifying structure and a rotary machine including the same.

According to a preferred embodiment of the present invention, a rectifying structure includes a stator, an electrode segment disposed in the stator, a rotor, a commutator segment disposed in the rotor, and a rotating element that includes a conductor and is disposed between the stator and the electrode segment, and the rotor and the commutator segment, the rotating element rolling on toward the stator, the electrode segment, the rotor, and the commutator segment, so that the rotor is so supported as to be rotatable about the stator, and the electrode segment is electrically connected to the commutator segment.

For example, the rectifying structure according to a preferred embodiment of the present invention is characterized in that: the stator includes an electrode-segment forming member; that the electrode segment is disposed in the electrode-segment forming member; that an annular stator-side groove is formed in the electrode-segment forming member and the electrode segment; that the rotor includes a commutator-segment forming member; that the commutator segment is disposed in the commutator-segment forming member; that an annular rotor-side groove is disposed in the commutator-segment forming member and the commutator segment so as to correspond to the stator-side groove; and that the rotating element is disposed within the stator-side groove and the rotor-side groove. In this construction, the rotating element includes, for example, a conductor ball, and the stator-side groove and the rotor-side groove are each formed so as to have, for example, a substantially circular arc-shaped cross section conforming to a contour of the conductor ball, or a substantially V-shaped cross section. Moreover, in this construction, the rotating element may include a plurality of conductor balls, and an insulator ball that is substantially identical in size with the conductor ball is interposed between the adjacent conductor balls.

For example, the rectifying structure according to a preferred embodiment of the present invention is characterized in that: the stator includes an electrode-segment forming member; that the electrode segment is disposed in the electrode-segment forming member; that the rotor includes a commutator-segment forming member arranged inside or outside the electrode-segment forming member; that the commutator segment is disposed in the commutator-segment forming member; that a substantially cylindrical cavity is formed between the electrode-segment forming member and the electrode segment, and the commutator-segment forming member and the commutator segment; and that the rotating element is disposed in the cavity. In this construction, for example, the electrode-segment forming member preferably has a substantially cylindrical form, and the commutator-segment forming member also has a substantially cylindrical form, but differs from the electrode-segment forming member in diameter. Moreover, in this construction, the rotating element includes, for example, a conductor ball or conductor cylinder. Further, in this construction, the rotating element may include a plurality of conductor balls, and an insulator ball that is substantially identical in size with the conductor ball may be interposed between the adjacent conductor balls. Alternatively, the rotating element may include a plurality of conductor cylinders, and an insulator cylinder that is substantially identical in size with the conductor cylinder may be interposed between the adjacent conductor cylinders.

According to another preferred embodiment of the present invention, a rotary machine includes a rectifying structure according to other preferred embodiments of the present invention. In the rectifying structure and the rotary machine according to various preferred embodiments of the present invention, the electrode segment disposed in the stator is electrically connected, through a rotating element defined by a conductor such as a conductor ball, to the commutator segment disposed in the rotor.

In the rectifying structure and the rotary machine according to various preferred embodiments of the present invention, the rotating element rolls on toward the stator, the electrode segment, the rotor, and the commutator segment. Thereby, the rotor is supported so as to be rotatable about the stator. Therefore, as compared with a conventional rectifying structure in which a brush is pressed against a commutator segment, friction and vibration are reliably minimized and prevented.

In the rectifying structure and the rotary machine according to preferred embodiments of the present invention, the stator-side groove and the rotor-side groove are preferably formed in the electrode-segment forming member and the electrode segment, and the commutator-segment forming member and the commutator segment, respectively. Moreover, where the rotating element includes a conductor ball, as compared with the case where neither the stator-side groove nor the rotor-side groove is formed, a wider contact area can be secured between the conductor ball and each of the electrode segment and the commutator segment, thereby reducing the electric resistance occurring therebetween. In this case, where the stator-side groove and the rotor-side groove are each formed so as to have a substantially circular arc-shaped cross section conforming to the contour of the conductor ball, the contact area between the conductor ball and each of the electrode segment and the commutator segment can be increased, thereby reducing the electric resistance occurring therebetween.

In the rectifying structure and the rotary machine according to another preferred embodiment of the present invention, where the rotating element includes a plurality of conductor balls, and, an insulator ball that is substantially identical in size with the conductor ball is interposed between the adjacent conductor balls, a short circuit can be prevented from occurring between the conductor balls.

Further, in the rectifying structure and the rotary machine according to a further preferred embodiment of the present invention, the electrode-segment forming member and the commutator-segment forming member are provided, and a cavity is formed. Moreover, where the rotating element includes a conductor cylinder, as compared with the case where the rotating element is constituted by a conductor ball, the contact area between the rotating element and each of the electrode segment and the commutator segment can be increased, thereby reducing the electric resistance occurring therebetween. Still further, in the rectifying structure and the rotary machine according to another preferred embodiment of the present invention, the rotating element includes a plurality of conductor balls, and an insulator ball that is substantially identical in size with the conductor ball is interposed between the adjacent conductor balls. Alternatively, the rotating element includes a plurality of conductor cylinders, and an insulator cylinder that is substantially identical in size with the conductor cylinder is interposed between the adjacent conductor cylinders. By so doing, a short circuit can be prevented from occurring between the conductor balls or conductor cylinders.

The above and further elements, characteristics, features, and advantages of the present invention will be more fully apparent from the following detailed description of preferred embodiments thereof with reference the accompanying drawings.

DETAILED DESCRIPTION OF PREFERRED EMBODIMENTS

Figure 1:
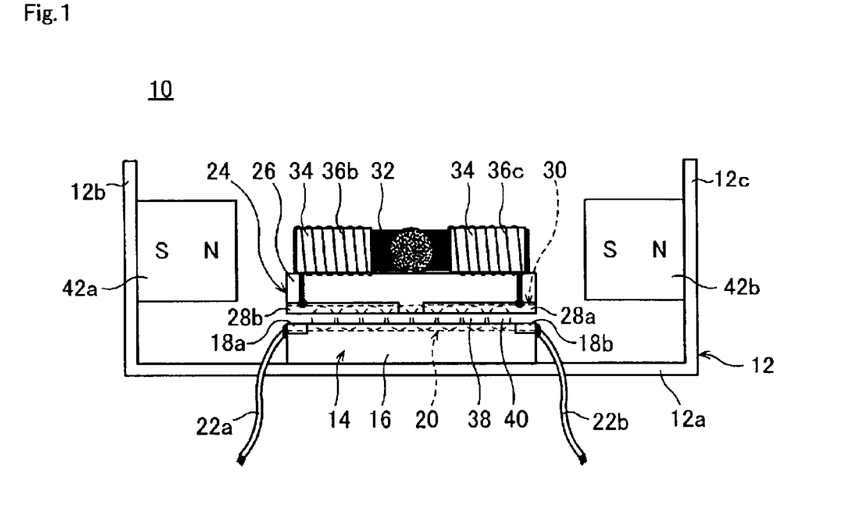
FIG. 1 is a front view showing one example of a DC motor including a rectifying structure according to a preferred embodiment of the present invention.
Figure 2:
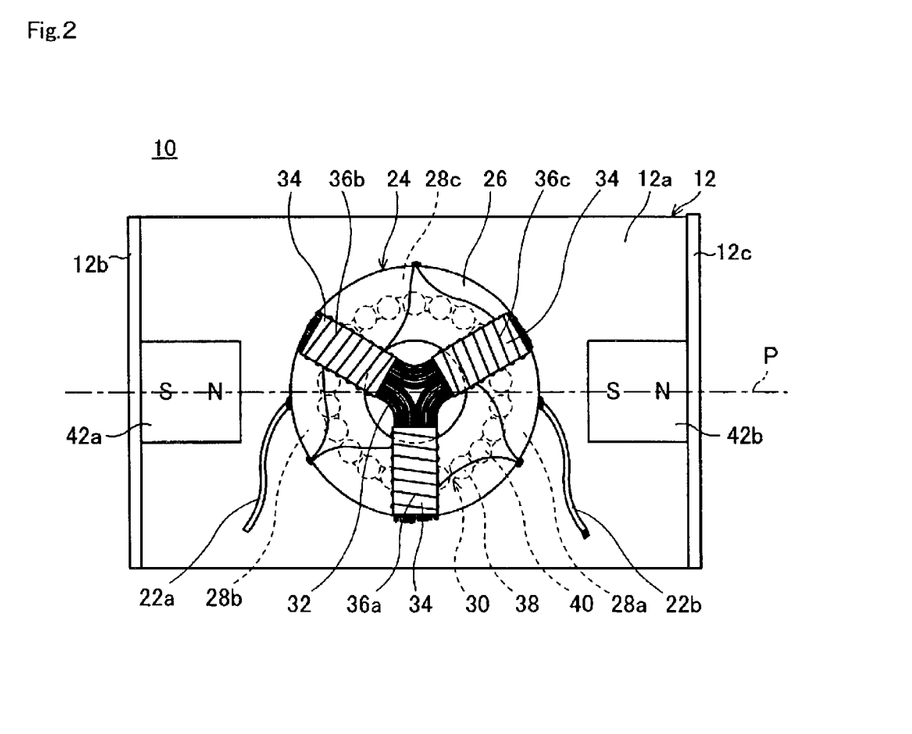
FIG. 2 is a plan view of the DC motor shown in FIG. 1.
Figure 3:
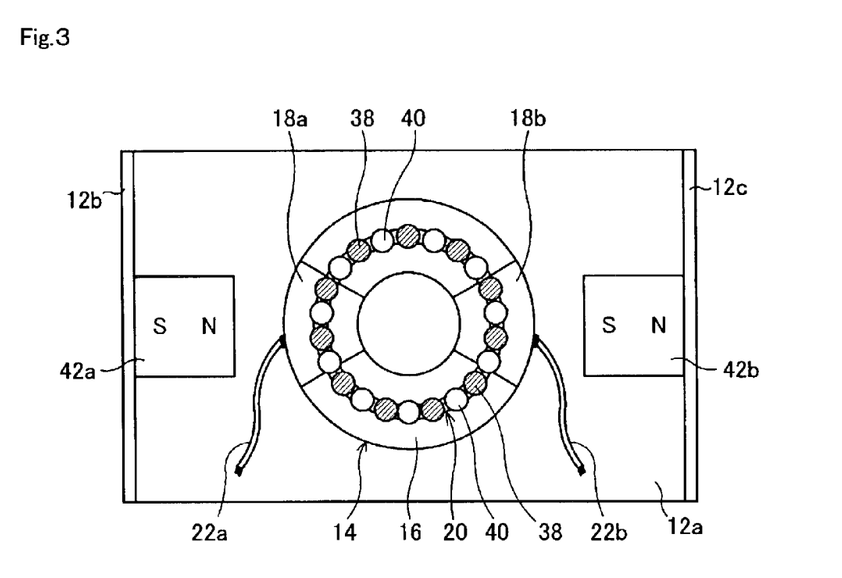
FIG. 3 is a plan view illustratively showing the DC motor shown in FIG. 1, with the rotor removed.
Figure 4:
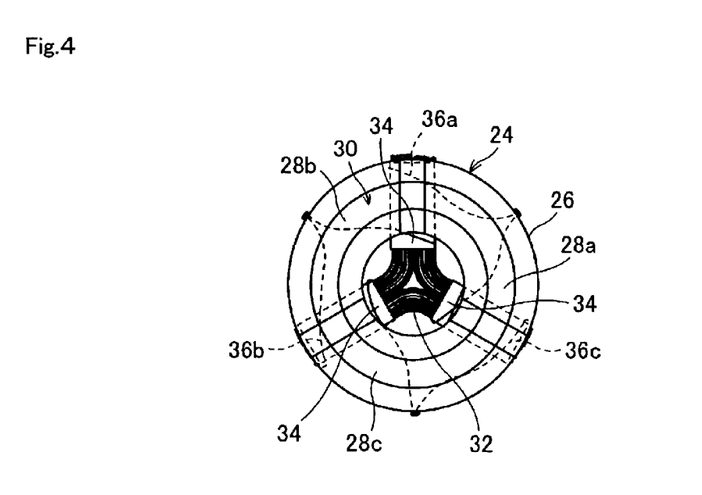
FIG. 4 is a bottom view showing the rotor for use in the DC motor shown in FIG. 1.
Figure 5:
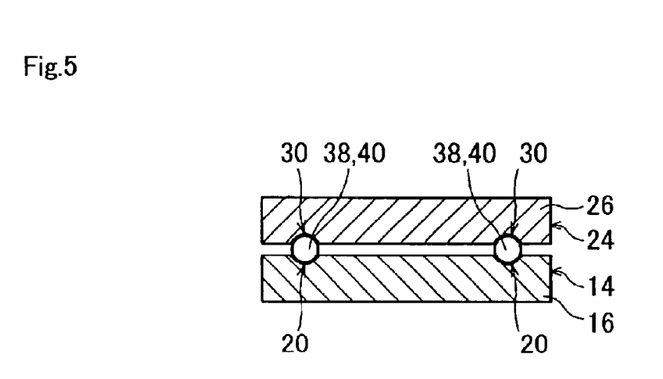
FIG. 5 is a sectional view illustratively showing the rectifying structure included in the DC motor shown in FIG. 1.

FIG. 1 is a front view showing one example of a DC motor including the rectifying structure according to various preferred embodiments of the present invention; FIG. 2 is a plan view of the DC motor; FIG. 3 is a plan view illustratively showing the DC motor with the rotor removed; FIG. 4 is a bottom view showing the rotor for use in the DC motor; and FIG. 5 is a sectional view illustratively showing the rectifying structure included in the DC motor.

The DC motor 10 shown in FIG. 1 includes a housing 12 having a substantially U-shaped cross section. That is, the housing 12 includes a substantially rectangular bottom plate 12a having substantially rectangular side plates 12b and 12c disposed at the opposite ends thereof.

In the housing 12, on the central portion of the bottom plate 12a is disposed a stator 14 including a hollow, disc-shaped electrode-segment forming member 16 preferably made of an insulator material, for example, a ceramic. The electrode-segment forming member 16 is bonded onto the bottom plate 12a of the housing 12 with an adhesive. On the upper through side regions of the electrode-segment forming member 16 are arranged two electrode segments 18a and 18b at an interval, for use as power supply. The electrode segments each preferably include a conductor such as copper or carbon. The two electrode segments 18a and 18b are preferably arranged so as to be symmetrical with respect to the approximate center of the electrode-segment forming member 16. The two electrode segments 18a and 18b are each arranged so as to be buried in an angular portion of the electrode-segment forming member 16 that is angled at approximately 60 degrees with respect to its center. Further, on the upper portion of the electrode-segment forming member 16 with the electrode segments 18a and 18b, a stator-side groove 20 is formed circumferentially about the approximate center of the electrode-segment forming member 16. The stator-side groove 20 is smoothly formed so as not to cause a level difference between the electrode-segment forming member 16 and the electrode segments 18a and 18b. The stator-side groove 20 is preferably substantially circular arc-shaped in cross section. Further, the electrode segments 18a and 18b are connected by soldering to one ends of lead wires 22a and 22b, respectively, at the periphery of the electrode-segment forming member 16.

Above the stator 14 is disposed a rotor 24 including a hollow, disc-shaped commutator-segment forming member 26 preferably made of an insulator material such as a ceramic. The size of the commutator-segment forming member 26 is preferably substantially identical to the electrode-segment forming member 16. In the lower through side regions of the commutator-segment forming member 26 are arranged three commutator segments 28a, 28b, and 28c at intervals. The commutator segments each include a conductor such as copper or carbon. The three commutator segments 28a, 28b, and 28c are each arranged so as to be buried inside an angular portion of the commutator-segment forming member 26 that is angled at about 120 degrees with respect to its center. Further, on the lower portion of the commutator-segment forming member 26 with the commutator segments 28a, 28b, and 28c, a rotor-side groove 30 is formed circumferentially about the approximate center of the commutator-segment forming member 26. The rotor-side groove 30 is smoothly formed so as not to cause a level difference between the commutator-segment forming member 26 and the commutator segments 28a, 28b, and 28c. The rotor-side groove 30 preferably has a substantially circular arc-shape in cross section. Moreover, the rotor-side groove 30 is preferably substantially identical in size with the stator-side groove 20 formed on the electrode-segment forming member 16 with the electrode segments 18a and 18b, so that the grooves 20 and 30 face each other.

Above the commutator-segment forming member 26 is disposed a Y-shaped core 32. To decrease an iron loss, the core 32 is formed by binding together a multiplicity of thin linear magnetic materials substantially in the shape of the letter "Y." The core 32 may alternatively be formed by stacking together a multiplicity of thin plate-shaped magnetic materials. The core 32 has insulating tapes 34 respectively wound on the three end portions thereof. Three coils 36a, 36b, and 36c are respectively wound on the three insulating tapes 34 provided for the end portions of the core 32. The core 32 is bonded to the commutator-segment forming member 26 with an adhesive. In this case, the core 32 has its portion with a winding of the coil 36a arranged between the commutator segments 28a and 28b, has its portion with a winding of the coil 36b arranged between the commutator segments 28b and 28c, and has its portion with a winding of the coil 36c arranged between the commutator segments 28c and 28a. First ends of the coils 36a, 36b, and 36c are connected by soldering to the commutator segments 28a, 28b, and 28c, respectively, at the periphery of the commutator-segment forming member 26. Second ends of the coils 36a, 36b, and 36c are connected by soldering to the commutator segments 28b, 28c, and 28a, respectively, at the periphery of the commutator-segment forming member 26.

Inside the stator-side groove 20 formed in the above-described electrode-segment forming member 16, etc. and the rotor-side groove 30 formed in the commutator-segment forming member 26, etc., 11 pieces of conductor balls 38 and 11 pieces of insulator balls 40 are alternately arranged as rotating elements. The conductor ball 38 is formed of a conductor such as a stainless steel or other suitable material, and the insulator ball 40 is formed of an insulator such as a ceramic or other suitable material. The conductor ball 38 and the insulator ball 40 are each shaped so as to conform to the sectional profile of the stator-side groove 20 and the rotor-side groove 30. Inside the stator-side groove 20 and the rotor-side groove 30, the conductor balls 38 roll on toward the stator 14, the electrode segments 18a and 18b, the rotor 24, and the commutator segments 28a, 28b, and 28c. Consequently, the rotor 24 is so supported by the conductor balls 38 as to be rotatable about the stator 14, and electrical connection is provided between the electrode segment 18a, 18b and its corresponding commutator segment 28a, 28b, 28c. Also, inside the stator-side groove 20 and the rotor-side groove 30, the insulator balls 40 roll on toward the stator 14, the electrode segments 18a and 18b, the rotor 24, and the commutator segments 28a, 28b, and 28c. Consequently, the rotor 24 is so supported by the insulator balls 40 as to be rotatable about the stator 14, and a short circuit can be prevented from occurring between the conductor balls 38, between the electrode segments 18a and 18b, and between the commutator segments 28a, 28b, and 28c.

In this DC motor 10, the stator 14, the electrode segments 18a and 18b the stator-side groove 20, the rotor 24, the commutator segments 28a, 28b, and 28c, the rotor-side groove 30, the conductor balls 38, and the insulator balls 40 constitute a rectifying structure.

In the DC motor 10, permanent magnets 42a and 42b are bonded to the side plates 12b and 12c, respectively, of the housing 12 with an adhesive. In this case, the permanent magnets 42a and 42b are arranged on opposite outer sides of the rotor 24 at slight intervals. This allows the rotor 24 to be rotated properly, and allows a magnetic field generated by the permanent magnets 42a and 42b to reach the core 32. The permanent magnet 42a is arranged with its north pole oriented to the center of the core 32, whereas the permanent magnet 42b is arranged with its south pole oriented to the center of the core 32.

In the DC motor 10, at the instant of connecting the lead wires 22a and 22b to a DC power source, electric current is fed, through the lead wires 22a and 22b, the electrode segments 18a and 18b, the conductor balls 38, and the commutator segments 28a, 28b, and 28c, to the coils 36a, 36b, and 36c, thereby generating a magnetic field in the core 32.

More specifically, as shown in FIG. 2, when the coil 36a is located on one side with respect to a pole axis P (i.e. the lower portion in FIG. 2) of the permanent magnets 42a and 42b, a tip of a portion of the core 32 wound with the coil 36a acts as the north pole. On the other hand, when the coil 36a is located on the other side with respect to the pole axis P (i.e. the upper portion in FIG. 2) of the permanent magnets 42a and 42b, a tip of a portion of the core 32 wound with the coil 36a acts as the south pole.

Similarly, when the coil 36b is located on one side with respect the pole axis P, a tip of a portion of the core 32 wound with the coil 36b acts as the north pole, whereas, when the coil 36b is located on the other side with respect to the pole axis P, a tip of a portion of the core 32 wound with the coil 36b acts as the south pole.

Further, similarly, when the coil 36c is located on one side with respect to the pole axis P, a tip of a portion of the core 32 wound with the coil 36c acts as the north pole, whereas, when the coil 36c is located on the other side with respect to the pole axis P, a tip of a portion of the core 32 wound with the coil 36c acts as the south pole.

Note that, when any of the coils 36a, 36b, and 36c is located on the pole axis P, the coil has its opposite ends electrically connected to each other via the conductor balls 38 and the commutator segments, and is thus free of current flow.

In this way, a magnetic field is generated in the core 32, thereby developing a repulsive force and an attraction force between the core 32 and the permanent magnets 42a and 42b. By the resultant repulsive and attraction forces, the rotor 24 is driven to rotate in one direction (left-hand direction).

In the rectifying structure of the DC motor 10, the conductor balls 38 and the insulator balls 40 roll on toward the stator 14, the electrode segments 18a and 18b, the rotor 24, and the commutator segments 28a, 28b, and 28c, so that the rotor 24 is supported so as to be rotatable about the stator 14. Thus, the rectifying structure, in contrast to the conventional one in which the brush is pressed against the commutator segment, succeeds in reducing friction and vibration.

The reduction in friction brings about the following advantages: because of a decrease in mechanical resistance, high efficiency and power conservation can be achieved, thus allowing for significant savings in the operating cost; because of a decrease in abrasion, the working life is prolonged, thus allowing for significant savings in the cost required for replacement of components; and, because of the minimal residues resulting from abrasion, the structure can be applied to any environment without concern for intrusion of dust particles, and savings in the cost required for dust prevention, cleaning, and maintenance can be achieved.

The reduction in vibration brings about the following advantages: because of the quietness, the cost required for sound isolation can be reduced; and, because of the minimal amount of electrical noise, the cost required for prevention of electric-wave interference can also be reduced.

In contrast to the conventional rectifying structure that uses a spring; requires a large number of constituent components; has a complicated configuration; and is difficult to assemble, the rectifying structure of the DC motor 10 does not use a spring; requires a fewer number of constituent components; has a simple configuration; and is greatly simplified in terms of an assembly process and component replacement. Hence, the rectifying structure allows for miniaturization and facilitates mass production.

In the rectifying structure of the DC motor 10, the electrode segments 18a and 18b, disposed in the stator 14, are electrically connected via the conductor balls 38 to the commutator segments 28a, 28b, and 28c disposed in the rotor 24.

Further, in the rectifying structure of the DC motor 10, the stator-side groove 20 is formed in the electrode-segment forming member 16 and the electrode segments 18a and 18b, and the rotor-side groove 30 is formed in the commutator-segment forming member 26 and the commutator segments 28a, 28b, and 28c. In this case, a wider contact area can be secured between the conductor ball 38 and each of the electrode segments 18a, 18b, the commutator segments 28a, 28b, 28c than in a case where such grooves are absent, thereby reducing the electric resistance occurring therebetween. Since each of the stator-side groove 20 and the rotor-side groove 30 has a substantially circular arc-shaped cross section conforming to the contour of the conductor ball 38, the contact area between the conductor ball 38 and each of the electrode segments 18a, 18b, the commutator segments 28a, 28b, 28c can be increased, thereby reducing the electric resistance occurring therebetween.

Moreover, in the rectifying structure of the DC motor 10, between the adjacent conductor balls 38 is interposed the insulator ball 40 that is substantially identical to the conductor ball 38 in size. This helps prevent a short circuit from occurring between the conductor balls 38, between the electrode segments 18a and 18b, and between the commutator segments 28a, 28b, and 28c.

Figure 6:
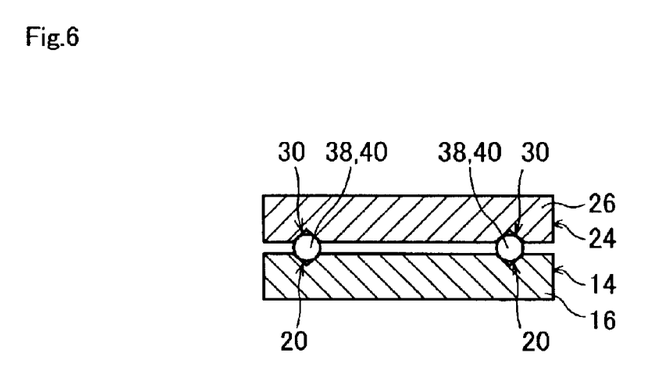
FIG. 6 is a sectional view illustratively showing another example of the rectifying structure included in the DC motor shown in FIG. 1.

FIG. 6 is a sectional view illustratively showing another example of the rectifying structure used in the DC motor shown in FIG. 1. In the rectifying structure shown in FIG. 6, unlike the rectifying structure shown in FIG. 5 for use in the DC motor 10 shown in FIG. 1, each of the stator-side groove 20 and the rotor-side groove 30 has a substantially V-shaped cross section. The rectifying structure shown in FIG. 6 provides the same effects as achieved in the rectifying structure shown in FIG. 5.

Figure 7:
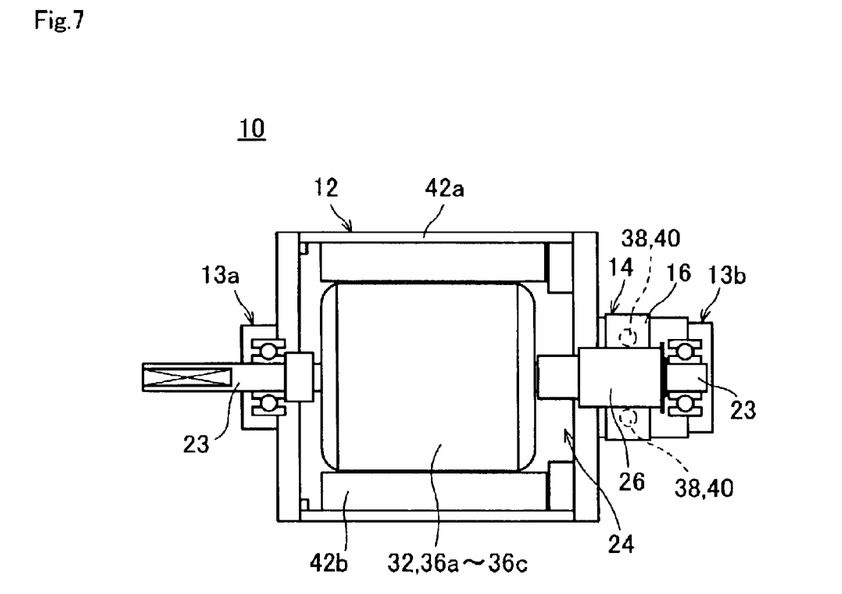
FIG. 7 is a view illustratively showing another example of the DC motor including the rectifying structure according to a preferred embodiment of the present invention.
Figure 8:
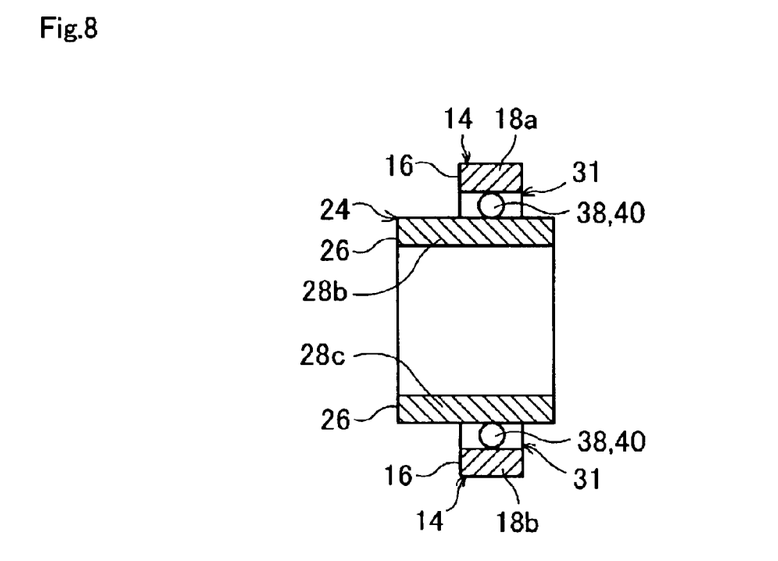
FIG. 8 is a sectional view illustratively showing the rectifying structure included in the DC motor shown in FIG. 7.
Figure 9:
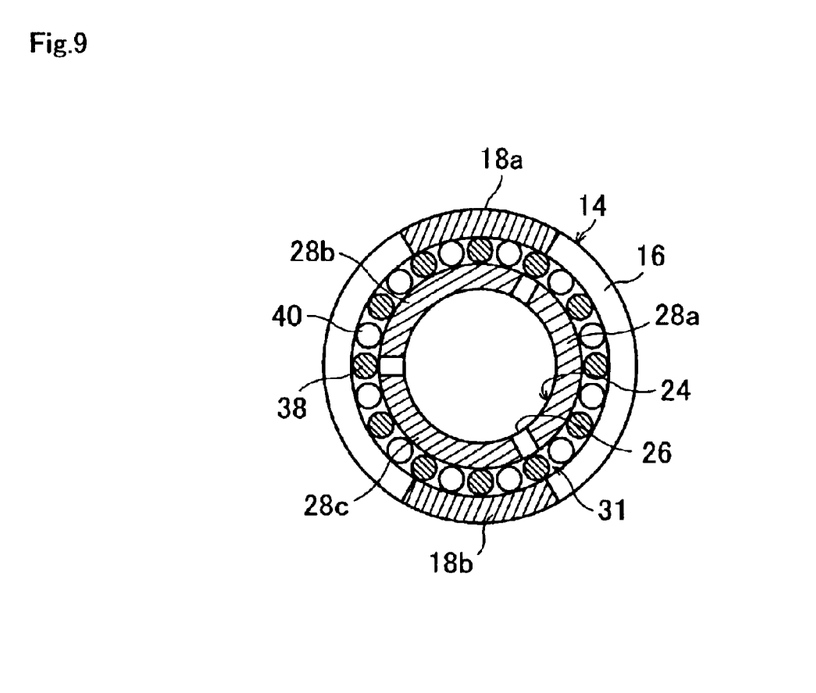
FIG. 9 is a side view illustratively showing the rectifying structure shown in FIG. 8.

FIG. 7 is a view illustratively showing another example of the DC motor including the rectifying structure according to preferred embodiments of the present invention; FIG. 8 is a sectional view illustratively showing the rectifying structure for use in the DC motor; and FIG. 9 is a side view illustratively showing the rectifying structure. In the DC motor 10 shown in FIG. 7, unlike the DC motor 10 shown in FIG. 1, the housing 12 takes a tubular shape.

The housing 12 has, at its one end, a stator 14 including a substantially cylindrical electrode-segment forming member 16 which is fixed to the housing 12. Two electrode segments 18a and 18b for use as power sources are disposed in the electrode-segment forming member 16.

The housing 12 has bearings 13a and 13b at both ends. A substantially cylindrical rotation shaft 23 has its opposite ends rotatably supported by the bearings 13a and 13b, respectively. Arranged partially along the rotation shaft 23 is a rotor 24 including a substantially cylindrical commutator-segment forming member 26 which is fixed to the rotation shaft 23. The commutator-segment forming member 26 preferably has a smaller diameter than that of the electrode-segment forming member 16 so as to be arranged inside the electrode-segment forming member 16. In the commutator-segment forming member 26 includes three commutator segments 28a, 28b, and 28c. Between the electrode-segment forming member 16 with the electrode segments 18a, 18b and the commutator-segment forming member 26 with the commutator segments 28a, 28b, 28c is formed a substantially cylindrical cavity 31 in which 11 pieces of conductor balls 38 and 11 pieces of insulator balls 40 are alternately arranged. The conductor ball 38 and the insulator ball 40 are preferably substantially identical in size.

Arranged partially along the rotation shaft 23 are a core 32 and three coils 36a to 36c. In addition, the housing 12 is provided with permanent magnets 42a and 42b that are disposed around the core 32 and the coils 36a to 36c.

In the rectifying structure of the DC motor 10 shown in FIG. 7, similar to the rectifying structure of the DC motor 10 shown in FIG. 1, the conductor balls 38 and the insulator balls 40 roll on toward the stator 14, the electrode segments 18a and 18b, the rotor 24, and the commutator segments 28a, 28b, and 28c, so that the rotor 24 is supported so as to be rotatable about the stator 14. Thus, the rectifying structure, in contrast to the conventional one in which the brush is pressed against the commutator segment, succeeds in reducing friction and vibration.

Further, in contrast to the conventional rectifying structure that uses a spring; requires a large number of constituent components; has a complicated configuration; and is difficult to assemble, the rectifying structure of the DC motor 10 shown in FIG. 7, similar to the rectifying structure of the DC motor 10 shown in FIG. 1, does not use a spring; requires a fewer number of constituent components; has a simple configuration; and simplifies an assembly process and component replacement. Hence, the rectifying structure allows for miniaturization and facilitates mass production.

Still further, in the rectifying structure of the DC motor 10 shown in FIG. 7, between the adjacent conductor balls 38 is interposed the insulator ball 40 that is preferably substantially identical with the conductor ball 38 in size. This helps prevent a short circuit from occurring between the conductor balls 38, between the electrode segments 18a and 18b, and between the commutator segments 28a, 28b, and 28c.

Figure 10:
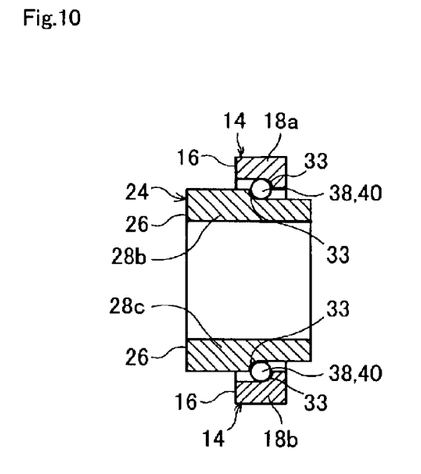
FIG. 10 is a sectional view illustratively showing another example of the rectifying structure included in the DC motor shown in FIG. 7.
Figure 11:
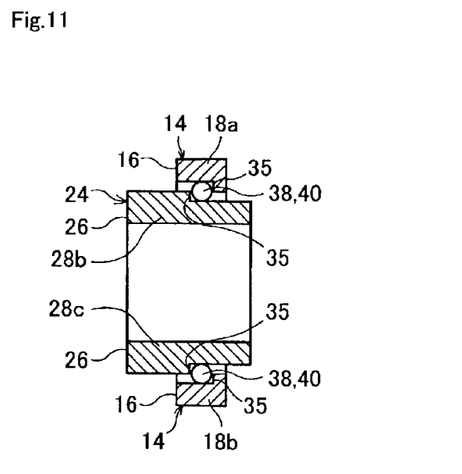
FIG. 11 is a sectional view illustratively showing still another example of the rectifying structure included in the DC motor shown in FIG. 7.
Figure 12:
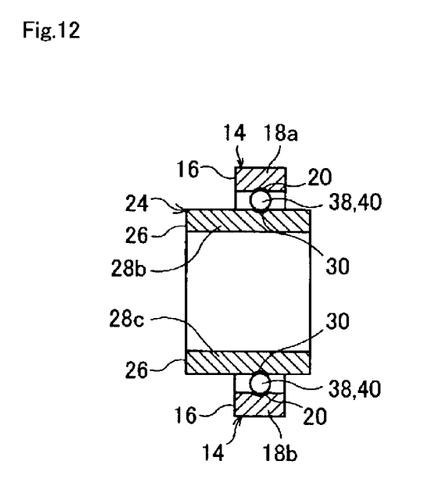
FIG. 12 is a sectional view illustratively showing a further example of the rectifying structure included in the DC motor shown in FIG. 7.
Figure 13:
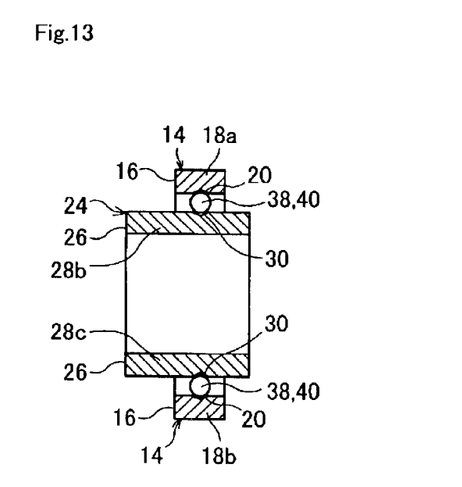
FIG. 13 is a sectional view illustratively showing a still further example of the rectifying structure included in the DC motor shown in FIG. 7.

In the rectifying structure shown in FIGS. 8 and 9 included in the DC motor 10 shown in FIG. 7, the electrode-segment forming member 16 with the electrode segments 18a, 18b and the commutator-segment forming member 26 with the commutator segments 28a, 28b, 28c are each preferably provided with a portion for receiving the conductor balls 38 and the insulator balls 40. The portion may take the following forms: a curved surface 33 as shown in FIG. 10; a stepped portion 35 as shown in FIG. 11; a stator-side groove 20 and rotor-side groove 30 having a substantially circular-arc shape as shown in FIG. 12; and a stator-side groove 20 and rotor-side groove 30 have a substantially V-shaped configuration as shown in FIG. 13.

As shown in FIGS. 10 through 13, by forming the curved surface 33, the stepped portion 35, or the stator-side groove 20 and rotor-side groove 30, the contact area between the conductor ball 38 and each of the electrode segments 18a, 18b, the commutator segments 28a, 28b, 28c can be increased, thereby reducing the electric resistance occurring therebetween.

Note that, although, in the above-described rectifying structure, the electrode-segment forming member 16 and the commutator-segment forming member 26 each have the shape of a hollow disc or a cylinder, they may be given any other shape so long as the purpose of the present invention is achieved. For example, each of the electrode-segment forming member 16 and the commutator-segment forming member 26 may have a block shape.

Although, in the above-described rectifying structure, a single electrode-segment forming member 16 has two electrode segments 18a and 18b disposed therein, in the present invention, it is also possible to provide two pieces of electrode-segment forming members each having two electrode segments disposed therein.

Although, in the rectifying structure shown in FIGS. 7 through 13, the commutator-segment forming member 26 is disposed inside the electrode-segment forming member 16, in the present invention, the commutator-segment forming member may be disposed outside the electrode-segment forming member.

Although, in the above-described rectifying structure, a single commutator-segment forming member 26 has three commutator segments 28a to 28c provided therein, in the present invention, the number of commutator segments to be provided in a single commutator-segment forming member may be arbitrarily varied so long as it is one or more. Moreover, in the present invention, two or more commutator-segment forming members may be provided as required.

Although, in the above-described rectifying structure, 11 pieces of conductor balls and also 11 pieces of insulator balls are preferably used as rotating elements, in the present invention, the number of rotating elements may be arbitrarily varied. In addition, the insulator balls do not necessarily have to be provided, if there is no need to prevent occurrence of a short circuit between the conductor balls. Moreover, rotating elements having other shapes may be used instead of the conductor balls. Examples thereof include a conductor cylinder; a substantially cylindrical conductor which is chamfered at its end portions; and a substantially cylindrical conductor having a groove formed at its periphery. Similarly, rotating elements of other shapes may be used instead of the insulator balls. Examples thereof include an insulator cylinder; a substantially cylindrical insulator which is chamfered at its end portions; and a substantially cylindrical insulator having a groove formed at its periphery.

Although the above-described rectifying structure is preferably for use in a two-pole DC motor, the rectifying structure according to preferred embodiments of the present invention is applicable to a DC motor of other type, a DC generator, an AC motor, an AC generator, or other rotary machine.

According to preferred embodiments of the present invention, there is provided a low-friction and low-vibration rectifying structure and a rotary machine.

In contrast to the conventional rectifying structure that uses a spring; requires a large number of constituent components; has a complicated configuration; and is difficult to assemble, the rectifying structure according to preferred embodiments of the present invention does not use a spring; requires a fewer number of constituent components; has a simple configuration; and simplifies an assembly process and component replacement. Hence, the rectifying structure allows for miniaturization and is suitable for mass production.

According to preferred embodiment of the present invention, in the rectifying structure including conductor balls or conductor cylinders as rotating elements, it is possible to suppress electric resistance occurring between the electrode segment or commutator segment and the conductor ball or conductor cylinder.

Further, according to preferred embodiments of the present invention, in the rectifying structure including conductor balls or conductor cylinders as rotating elements, it is possible to prevent a short circuit from occurring between the conductor balls or between the conductor cylinders.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A rectifying structure comprising:
   a stator;
   an electrode segment disposed in the stator;
   a rotor;
   a commutator segment disposed in the rotor; and
   a rotating element made of a conductor disposed between the stator and the electrode segment, and the rotor and the commutator segment, the rotating element rolling on toward the stator, the electrode segment, the rotor, and the commutator segment, so that the rotor is so supported as to be rotatable about the stator, and the electrode segment is electrically connected to the commutator segment; wherein
   the stator includes an electrode-segment forming member;
   the electrode segment is disposed in the electrode-segment forming member;
   an annular stator-side groove is disposed in the electrode-segment forming member and the electrode segment;
   the rotor includes a commutator-segment forming member;
   the commutator segment is disposed in the commutator-segment forming member;
   an annular rotor-side groove is formed in the commutator-segment forming member and the commutator segment so as to face the stator-side groove; and
   the rotating element is disposed within the stator-side groove and the rotor-side groove.

2. The rectifying structure according to claim 1, wherein the rotating element Includes a conductor ball, and
   the stator-side groove and the rotor-side groove each have a substantially circular arc-shaped cross section conforming to a contour of the conductor ball.

3. The rectifying structure according to claim 1, wherein
the rotating element includes a conductor ball, and
the stator-side groove and the rotor-side groove each have a substantially V-shaped cross section.

4. The rectifying structure according to claim 2, wherein
the rotating element includes a plurality at the conductor balls, and
an insulator ball that is substantially identical to the conductor ball in size is interposed between the adjacent conductor balls.

5. A rectifying structure comprising:
a stator;
an electrode segment disposed in the stator;
a rotor;
a commutator segment disposed in the rotor; and
a rotating element made of a conductor disposed between the stator and the electrode segment, and the rotor and the commutator segment, the rotating element rolling on toward the stator, the electrode segment, the rotor, and the commutator segment, so that the rotor is so supported as to be rotatable about the stator, and the electrode segment is electrically connected to the commutator segment; wherein
the stator includes an electrode-segment forming member;
the electrode segment is disposed in the electrode-segment forming member;
the rotor includes a commutator-segment forming member arranged inside or outside the electrode-segment forming member;
the commutator segment is disposed in the commutator-segment forming member;
a cylindrical cavity is formed between the electrode-segment forming member and the electrode segment, and the commutator-segment forming member and the commutator segment; and
the rotating element is arranged in the cavity.

6. The rectifying structure according to claim 5, wherein
the electrode-segment forming member has a substantially cylindrical form, and
the commutator-segment forming member has a substantially cylindrical form, but differs from the electrode-segment forming member in diameter.

7. The rectifying structure according to claim 5, wherein
the rotating element includes a conductor ball.

8. The rectifying structure according to claim 7, wherein
the rotating element includes a plurality of the conductor balls, and
an insulator ball that is substantially identical with the conductor ball in size is interposed between the adjacent conductor balls.

9. The rectifying structure according to claim 5, wherein
the rotating element includes a conductor cylinder.

10. The rectifying structure according to claim 9, wherein
the rotating element includes a plurality of the conductor cylinders, and an insulator cylinder that is substantially identical with the conductor cylinder in size is interposed between the adjacent conductor cylinders.

11. The rotary machine comprising a rectifying structure as set forth in claim 1.

12. The rectifying structure according to claim 3, wherein
the rotating element includes a plurality of the conductor balls, and
an insulator ball that is substantially identical to the conductor ball in size is interposed between the adjacent conductor balls.

13. The rectifying structure according to claim 6, wherein
the rotating element includes a conductor ball.

14. The rectifying structure according to claim 6, wherein
the rotating element includes a conductor cylinder.

15. The rotary machine comprising a rectifying structure as set forth in claim 5.

* * * * *